United States Patent [19]

Lampron

[11] Patent Number: 5,403,052
[45] Date of Patent: Apr. 4, 1995

[54] EGG SPATULA

[76] Inventor: Louis Lampron, 2675 DuVerger, Mascouche, J7K 1E5, Canada

[21] Appl. No.: 227,520

[22] Filed: Apr. 14, 1994

[30] Foreign Application Priority Data

Apr. 14, 1993 [GB] United Kingdom ............... 9307856

[51] Int. Cl.⁶ ............................................. A47J 43/28
[52] U.S. Cl. ......................................................... 294/7
[58] Field of Search ................. 294/1.1, 2, 3, 7, 8, 294/8.5, 32, 33, 99.2, 104, 106; 30/142, 147–150

[56] References Cited

U.S. PATENT DOCUMENTS

| D. 127,728 | 6/1941 | Tonelli | 294/99.2 X |
|---|---|---|---|
| 836,440 | 11/1906 | Collins | 294/7 |
| 856,446 | 6/1907 | Collins | 294/7 |
| 967,263 | 8/1910 | Sweeting | 294/7 |
| 1,538,808 | 5/1925 | Hedeen | 294/7 X |
| 1,948,592 | 2/1934 | Nelson | 294/1.1 |
| 2,455,623 | 12/1948 | Stone | 294/3 X |
| 2,573,922 | 11/1951 | Meyer | 294/7 |
| 2,670,234 | 2/1954 | Roop | 294/99.2 |
| 2,674,793 | 4/1954 | Dominick | 294/3 X |
| 4,223,936 | 9/1980 | Jorgensen | 294/7 X |

FOREIGN PATENT DOCUMENTS

| 581736 | 9/1958 | Italy | 294/7 |
|---|---|---|---|
| 1442322 | 7/1976 | United Kingdom | 294/7 |

*Primary Examiner*—Johnny D. Cherry

[57] ABSTRACT

A kitchen spatula for handling eggs during the preparation thereof allows the user to grasp the egg being manipulated without puncturing its yolk. The spatula has a substantially flat spatula paddle and an elongated paddle handle attached to it. The spatula also has an elongated clamping handle and a substantially flat clamping member rigidly fixed to the clamping handle. A substantially U-shaped indentation is provided in the clamping member, the indentation defining a pair of fingers projecting substantially forwardly, the fingers being spaced apart by a spacing of sufficient size to accommodate the yolk of the egg. The clamping handle is adapted to be hingedly pivoted relatively to the paddle handle so that the fingers of the clamping member and the spatula paddle will act as tongs grasping the albumen portion of the egg while the yolk portion will be nested between the fingers of the clamping member.

6 Claims, 3 Drawing Sheets

EGG SPATULA

BACKGROUND OF THE INVENTION

1. Field of the Invention

The present invention relates to the field of culinary utensils and is particularly concerned with a kitchen spatula for handling eggs during the preparation thereof.

2. Prior Art

The art of kitchen utensils is replete with spatulas of various shapes and sizes. The most common kitchen spatula consists of a substantially flat spatula blade extending integrally into a handle.

This type of utensil is frequently used during cooking operations to flip over food being, for example, grilled in a sauce pan. The conventional spatula is also often used to manipulate the food when it is being placed or removed for a cooking receptacle.

In order to improve the efficiency of the spatula in manipulating the food, a number of spatulas have been provided with various components mostly dedicated to grasping the food in order to prevent it from slipping off the spatula blade.

Examples of such utensils are disclosed in U.S. Pat. No. 2,643,907 issued to J. B. Thomas, Jun. 30, 1953; U.S. Pat. No. 2,292,889 issued to I. A. McKee, Aug. 11, 1942; U.S. Pat. No. 3,492,039 issued to J. F. Chmela, January, 1970; U.S. Pat. No. 2,801,873 issued to J. E. Faughnder, Aug. 6, 1957 and U.S. Pat. No. 4,955,971 issued to Goulter, Sep. 11, 1990.

Although the spatulas disclosed in the above mentioned patents may be adequate to grip and manipulate various types of food products, they do not form an elegant solution for the manipulation of eggs.

Indeed, the egg has specific characteristics which structurally set it apart from other food products. When an egg is being fried, its yolk portion bulges upwardly in a substantially hemispherical configuration from the albumen or so-called "white" portion. The yolk is fragile and susceptible of being punctured.

Fried eggs are typically served in either a "sunny side up" or an "over easy" configuration. In both configuration, the yolk remains unpunctured and surrounded by the albumen or so-called "white" portion. The spatulas disclosed in the above mentioned patents are not suited for manipulating an egg without puncturing its yolk.

SUMMARY OF THE INVENTION

Accordingly, an object of the present invention is to provide an improved egg spatula.

The egg spatula in accordance with the present invention will allow the user to grasp the egg being manipulated without puncturing its yolk.

According to one embodiment of the invention, there is provided a spatula for manipulating an egg having a yolk portion and an albumen portion, said spatula comprising a substantially flat spatula paddle, an elongated paddle handle having a handle proximal end and a handle distal end, said handle proximal end being rigidly fixed to said spatula paddle, an elongated clamping handle having a clamping handle proximal end and a clamping handle distal end, said clamping handle distal end being hingedly fixed to said handle distal end, a substantially flat clamping member rigidly fixed to said clamping handle proximal end, a substantially U-shaped indentation provided in said clamping member, said indentation defining a pair of fingers projecting substantially forwardly, said fingers being spaced apart by a spacing of sufficient size to accommodate said yolk of said egg, whereby said clamping handle is adapted to be hingedly pivoted relatively to said paddle handle so that said fingers of said clamping member and said spatula paddle will act as tongs grasping said albumen portion of said egg while said yolk portion will be nested between said fingers of said clamping member.

Conveniently, said biasing means for biasing said paddle handle and said clamping handle away from each other is positioned between said paddle handle and said clamping handle.

Preferably, said biasing means is a bent segment of substantially resilient material extending integrally from said handle distal end into said clamping handle distal end.

Conveniently, said spatula is formed entirely of an injected moldable piece of polymeric material.

In the preferred embodiment, each one of said fingers has a finger width, wherein said fingers are spaced apart by a distance of at least one inch and wherein each one of said fingers has a width of at least one quarter of an inch so that said fingers will offer a sufficiently large contact surface so as not to damage said albumen portion.

DETAILED DESCRIPTION

Figure 1:
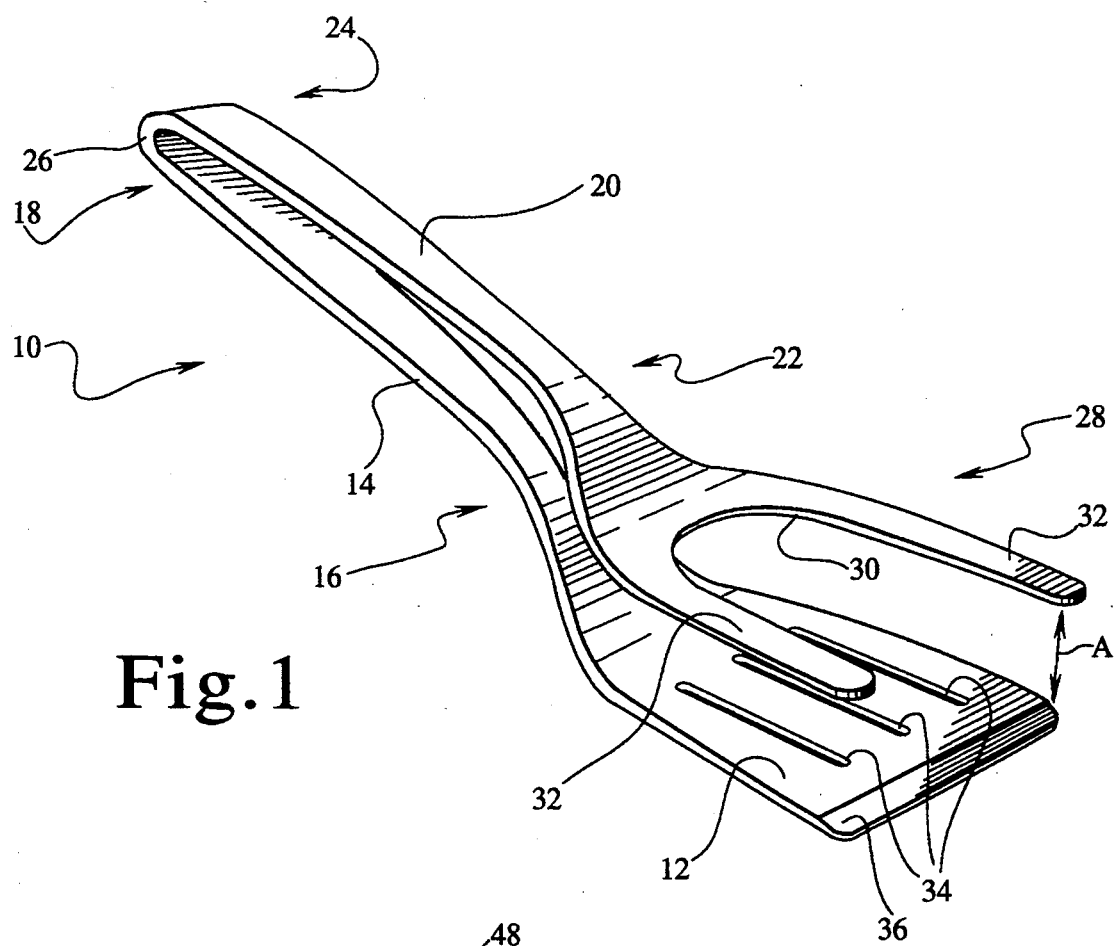
FIG. 1: in a perspective view illustrates an egg spatula in accordance with an embodiment of the present invention.

Referring to FIG. 1, there is shown an egg spatula 10 in accordance with an embodiment of the present invention.

The egg spatula 10 has a substantially flat paddle 12. An elongated paddle handle 14 extends integrally from the flat paddle 12. The paddle handle 14 thus has a handle proximal end 16 attached to the paddle and a handle distal end 18. A clamping arm 20 having a clamping arm proximal end 22 and a clamping arm distal end 24 is hingedly fixed by an hinge link to the distal end 18 of the paddle handle 14. In the embodiment illustrated in FIG. 1, the hinge link is a bent section 26 of relatively resilient material having a substantially curved configuration. The distal end 18 of the paddle handle 14 thus extends integrally into the section 24 which in turn extends integrally into the clamping arm 20. The proximal end 22 of the clamping arm 20 extends integrally into a clamping fork 28.

The clamping fork 28 is substantially flat. The clamping fork 28 has a frontal substantially U-shaped indentation 30 which defines a pair of frontwardly projecting fingers 32.

In use, the clamping arm 20 is adapted to be pivoted about its distal end 24 relatively to the paddle handle 14. The pivotal action of the clamping arm 20 is schematized by arrow A in FIG. 1. The paddle 12 has a set of optional elongated gripping slots 34 extending therethrough. The top surface of the paddle 12 has a bevelled section 36 adjacent its peripheral edge.

FIGS. 3 through 7 illustrate a sequence of actions which are typically performed when an egg is being flipped over with a spatula 10 in accordance with an embodiment of the invention.

Figure 2:
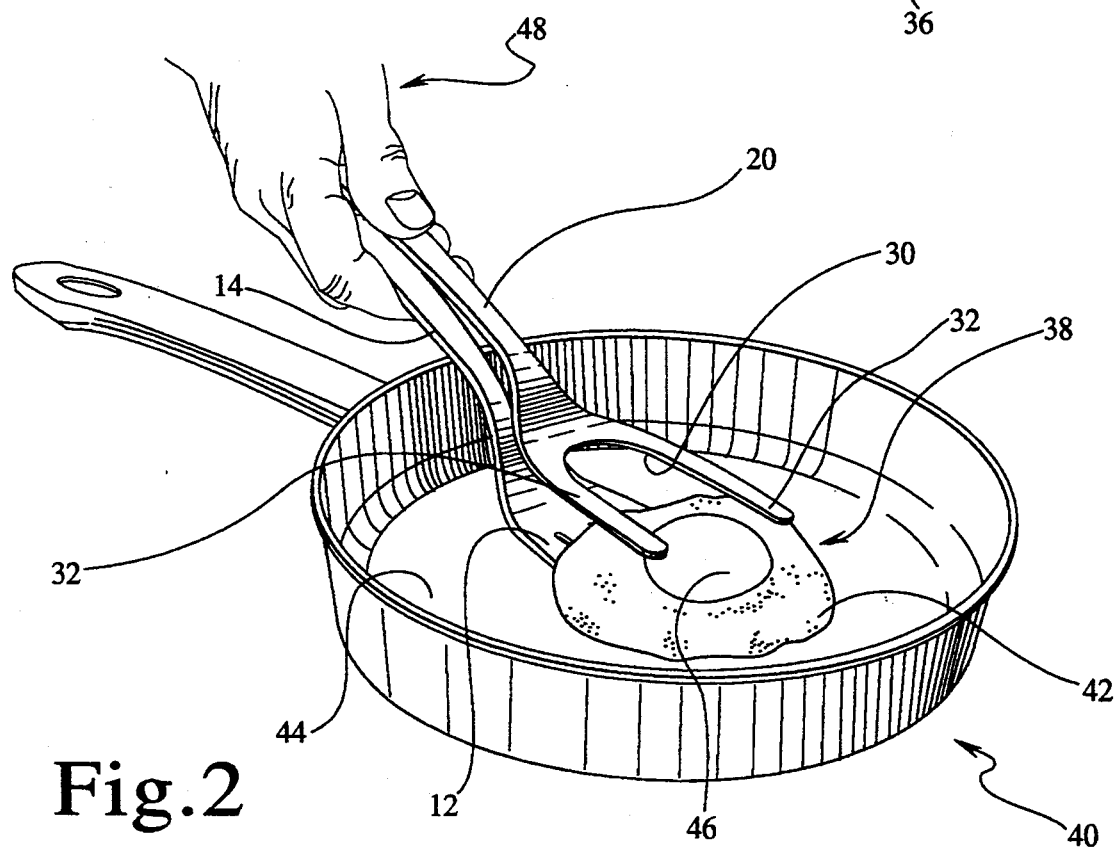
FIG. 2: in a perspective view illustrates an egg in a frying pan being grasped by a spatula in accordance with an embodiment of the present invention.
Figure 3:
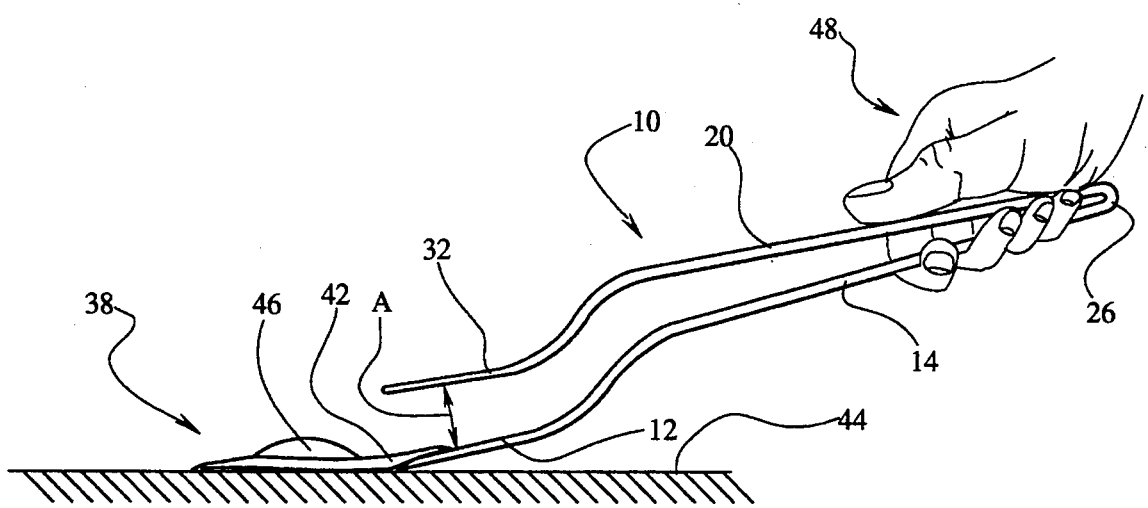
FIGS. 3 through 7 in sequential elevational views illustrate an egg being flipped over by a spatula in accordance with an embodiment of the present invention.

When a frying egg 38 needs to be manipulated, for example turned over, as is the case in the preparation of a so-called "easy over" fried egg, the user must first scrape the egg 38 from the frying pan 40 by sliding the flat paddle 12 between the albumen or so-called "white" section 42 and the bottom wall of the frying pan 40. As illustrated in FIGS. 2 and 3, during the scraping action, the clamping arm 20 and the clamping fork 28 are kept in spaced relationship relatively to the paddle handle 14 and the paddle 12.

The spatula 10 is manipulated so that the yolk portion 46 of the egg 38 is positioned in registry with the indentation 30.

Figure 4:
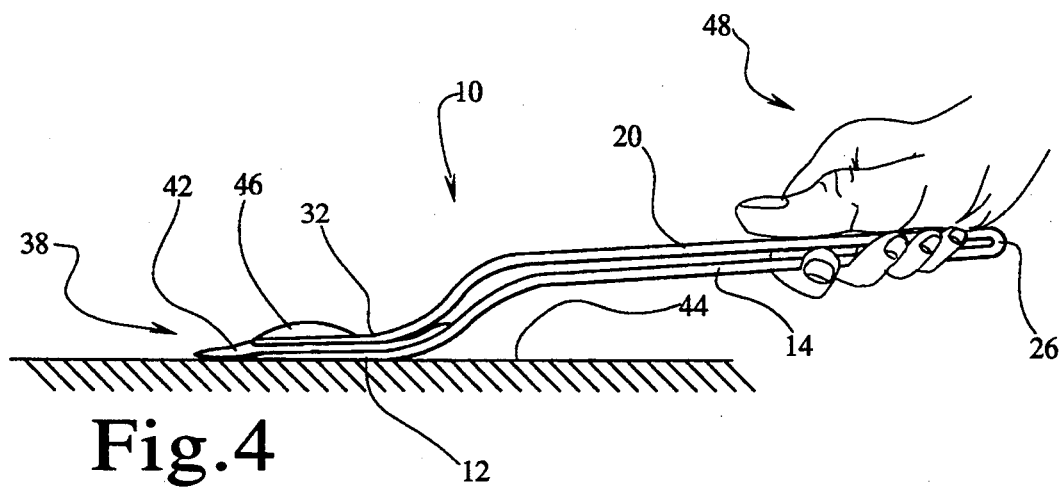
Figure 5:
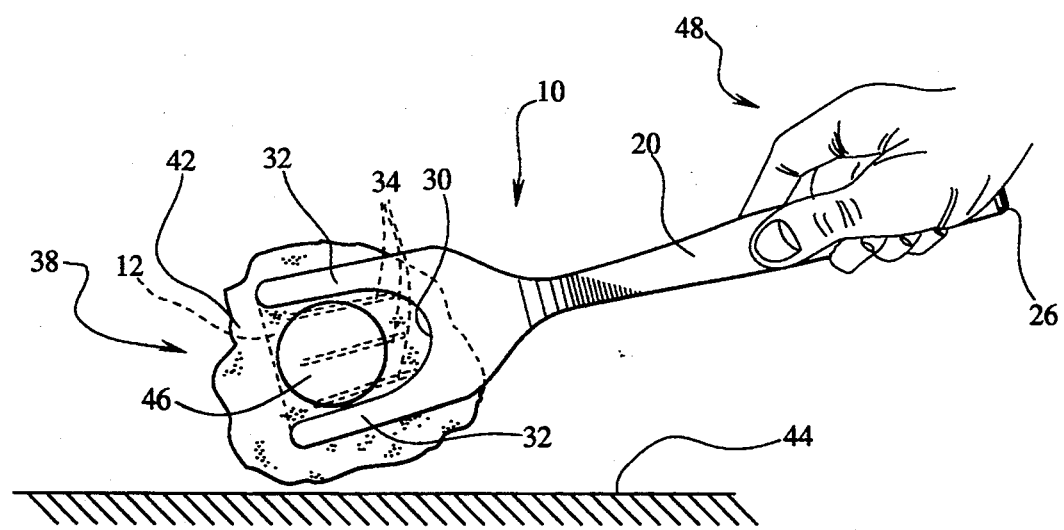
Figure 6:
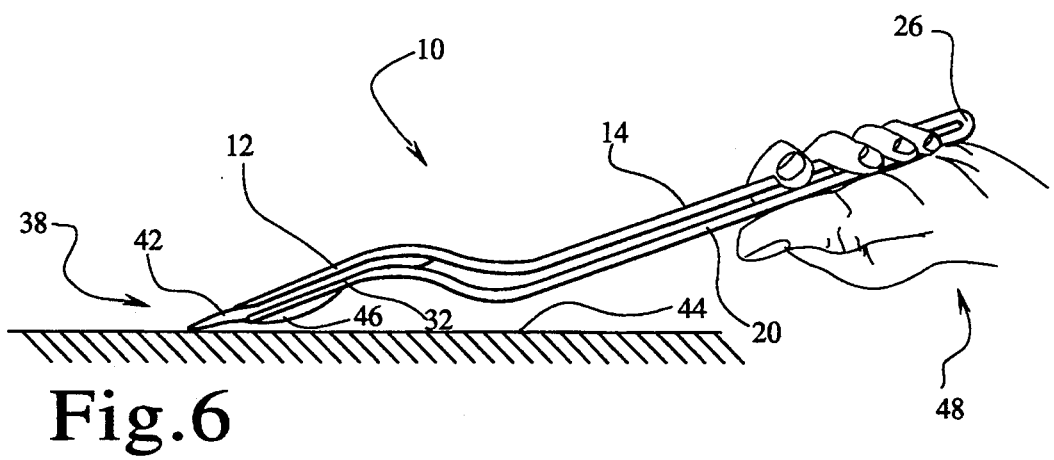

As illustrated in FIG. 4, to grasp the egg 38, the hand 48 of the user squeezes the clamping arm 20 towards the paddle handle 14, causing the section 26 to bend and the clamping fork 28 to move towards the paddle 12. The albumen or so-called "white" section 42 of the egg 38 is thus squeezed between the fingers 32 of the clamping fork 28 and the flat paddle 12, while the yolk portion 46 is nested between the fingers 32. With the clamping fork 28 and the paddle 12 acting as tongs, the egg 38 is thus safely clamped by the spatula 10 without puncturing its yolk section 46. The egg 38 being securely clamped by the spatula 10, it can be pivoted as illustrated in FIG. 5. The egg 38 with its yolk section 46 facing downwardly as illustrated in FIG. 6, can then be gently put in contact with the bottom wall 44 of the pan 40, again minimizing the risk of puncturing the yolk.

By releasing the grasping action which squeezes the paddle handle 14 towards the clamping arm 20, the user then allows the bent section 26 to bring the clamping arm 20 back to its original spaced relationship relative to the paddle handle 14, thus allowing the egg 38 to slide off the spatula.

Figure 7:
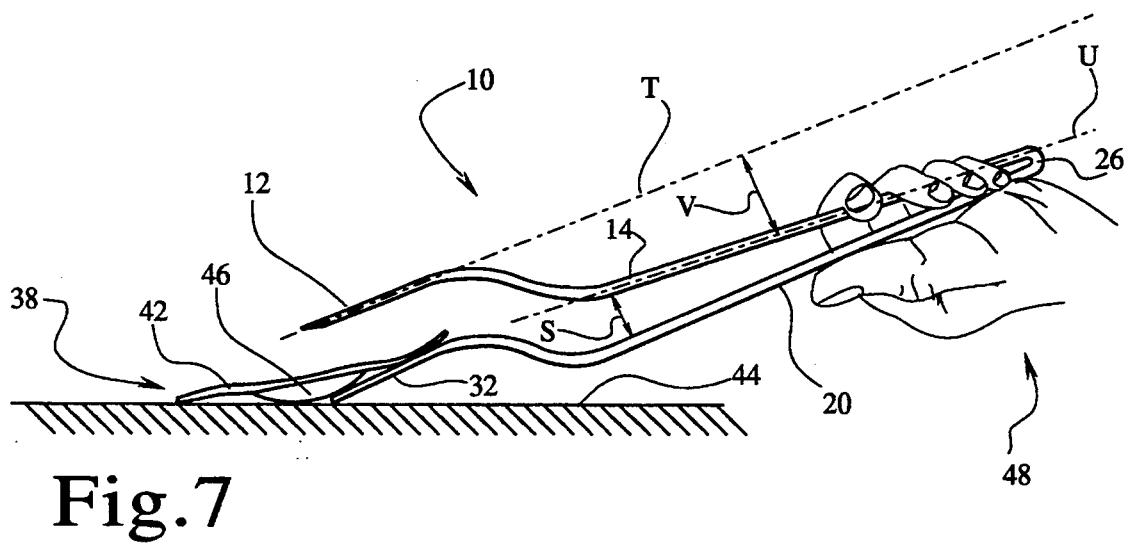

The reference letter S is used in FIG. 7 to illustrate the spacing between the paddle handle 14 and the clamping arm 20 when no squeezing action is exerted on them.

In the preferred embodiment illustrated in FIGS. 1 through 7, the spatula 10 is formed out of one integral piece of injection molded polymeric material. The handle proximal end 16 and the clamping arm proximal end 22 are both bent in order to form a spacing V between a plane T defined by the paddle 12 and a plane U defined by the paddle handle 14.

Each one of the fingers 32 defines a substantially flat grasping surface. The fingers 32 typically have a width greater than ¼ of an inch in order to apply the squeezing force over a relatively large surface, thus minimizing the risk of damaging the albumen or so-called "white" portion 42.

I claim:

1. A spatula for manipulating an egg having a yolk portion and an albumen portion, said spatula comprising:
   - a substantially flat spatula paddle,
   - an elongated paddle handle having a paddle handle proximal end and a paddle handle distal end, said paddle handle proximal end being rigidly fixed to said spatula paddle,
   - an elongated clamping handle having a clamping handle proximal end and a clamping handle distal end, said clamping handle distal end being resiliently connected to said paddle handle distal end,
   - a substantially flat clamping member rigidly fixed to said clamping handle proximal end, said clamping member being selectively engageable with said spatula paddle,
   - a single substantially U-shaped indentation provided in said clamping member, said single indentation defining a single pair of fingers projecting substantially forwardly, said fingers being spaced apart by a spacing of sufficient size to accommodate said yolk portion of said egg, whereby said clamping handle is adapted to be pivoted relatively to said paddle handle so that said fingers of said clamping member and said spatula paddle will act as tongs grasping said albumen portion of said egg while said yolk portion will be nested between said fingers of said clamping member, said spatula thus allowing a user to sequentially grasp said egg, turn said egg over and to slide said egg out of said spatula without said spatula coming into contact with said yolk portion and without damaging said yolk portion.

2. A spatula as recited in claim 1, wherein a biasing means for biasing said paddle handle and said clamping handle away from each other is positioned between said paddle handle and said clamping handle.

3. A spatula as recited in claim 2, wherein said biasing means is a bent segment of substantially resilient material extending integrally from said handle distal end into said clamping handle distal end.

4. A spatula as recited in claim 1, wherein said spatula is formed entirely of an injected moldable piece of polymeric material.

5. A spatula as recited in claim 1, wherein said fingers are spaced apart by a distance of at least one inch.

6. A spatula as recited in claim 1 wherein each of said fingers has a finger width and wherein said finger width has a value of at least one quarter of an inch.

* * * * *